(No Model.)

A. MORGAN.
SPRING SHADE ROLLER.

No. 294,494. Patented Mar. 4, 1884.

WITNESSES:
Chas. F. Van Horn
G. F. Huntington

INVENTOR,
Abbott Morgan
By S. J. Van Stavoren
ATTORNEY.

UNITED STATES PATENT OFFICE.

ABBOTT MORGAN, OF PHILADELPHIA, PENNSYLVANIA.

SPRING SHADE-ROLLER.

SPECIFICATION forming part of Letters Patent No. 294,494, dated March 4, 1884,

Application filed April 2, 1883. (No model.)

*To all whom it may concern:*

Be it known that I, ABBOTT MORGAN, a citizen of the United States, residing at Philadelphia, in the county of Philadelphia and State of Pennsylvania, have invented certain new and useful Improvements in Spring Shade-Rollers, of which the following is a specification, reference being had therein to the accompanying drawings, wherein—

Figure 1:
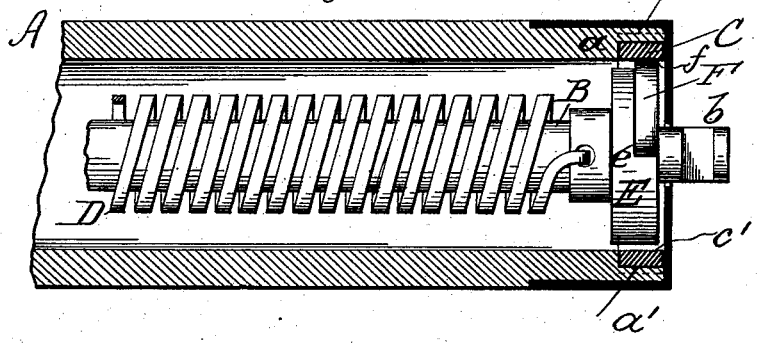
Figure 2:
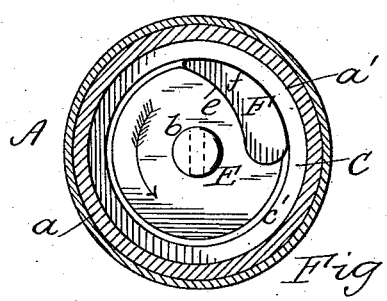
Figure 3:
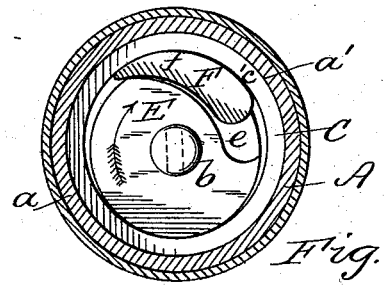

Figure 1 is a broken longitudinal section of a shade-roller embodying my invention, and Figs. 2 and 3 are transverse sections.

My invention has relation to balanced spring shade-rollers, having especial reference to that form of such rollers wherein are employed a disk on the spindle for obtaining the desired friction on the roller when the shade is descending or the spring is being wound up, and a cylinder or ball fitting in a tapering recess in said disk for locking the spring to prevent it unwinding when the roller is removed from the brackets; and it has for its object to so construct such disk and the locking device that the latter serves the double purpose of affording the requisite friction for the roller upon the downward movement of the shade and to lock the spring when the roller is taken out of the brackets.

My invention accordingly consists of the novel construction and arrangement of the parts as hereinafter specifically described and claimed, having reference particularly to the provision of a shade-roller spring-balanced, having a true or circular disk secured to the spindle, a tapering recess in the periphery of the disk, and an elongated tapering cam seating in said slot so as to impinge upon or contact with a washer secured in an annular recess or socket in the end of the roller.

In the drawings, A represents a shade-roller having a spindle, B, with angular end $b$ and spiral spring D, connected in the well-known or other desirable manner, to form a balanced spring shade-roller, and need not, therefore, be more particularly described. The end $a$ of roller A is formed with an annular socket, $a'$, into which is driven a bushing or washer, C. Upon the spindle B is secured a true or circular disk, E, having a peripheral tapering recess, $e$, which receives a correspondingly-shaped cam, F, or one of an elongated and tapering configuration, as illustrated. The outer edge, $f$, of said cam is of the same curve as that of the inner periphery, $c'$, of washer C, so that when said cam is in its normal position, or in the recess $e$, as shown in Fig. 2, its edge $f$, from end to end, impinges upon or contacts with the periphery $c'$ of washer C, to provide the requisite friction upon the roller when the shade is drawn down or the spring D wound up.

Any desired degree of friction between the roller and cam F may be obtained by varying the length of the latter in the process of manufacture.

When the weight of the shade is raised to permit the spring to roll up the shade, the roller A raises the washer C out of engagement with cam F and relieves the friction between said parts during the ascent of the shade.

When the roller is removed from the brackets, the initial unwinding of the spring rotates the disk E in the direction indicated by the arrow in Fig. 3, and causes cam F to move or jump out of the recess $e$ and wedge itself between said disk and washer, as illustrated in said figure, to lock the spring or prevent further unwinding of the same. If desired, the washer C may be dispensed with and the cam F arranged or enlarged to bear against the bore of the roller.

It will be observed from the foregoing that the cam F serves both for a friction device for the roller and for a lock for the spring.

What I claim is—

1. In a spring shade fixture or roller, a circular or true spindle-disk, E, having tapering recess $e$, elongated tapering cam F, and roller A, substantially as set forth.

2. In a spring shade-roller, a circular or true spindle-disk E, having tapering recess $e$, elongated tapering cam F, and washer C, substantially as shown and described.

In testimony whereof I affix my signature in presence of two witnesses.

ABBOTT MORGAN.

Witnesses:
S. J. VAN STAVOREN,
CHAS. F. VAN HORN.